United States Patent
Krawczyk

[11] Patent Number: 6,019,381
[45] Date of Patent: Feb. 1, 2000

[54] MULTIPLE USE HAND TRUCKS FITTED TO CARRY LAUNDRY BASKETS

[75] Inventor: Joseph D. Krawczyk, Pinconning, Mich.

[73] Assignee: Magline, Inc., Pinconning, Mich.

[21] Appl. No.: 08/843,693

[22] Filed: Apr. 16, 1997

Related U.S. Application Data

[60] Provisional application No. 60/015,600, Apr. 18, 1996.

[51] Int. Cl.[7] ................................. B62B 5/00; B62B 3/02
[52] U.S. Cl. .................................. 280/47.18; 280/47.35; 280/79.2; 211/71.01; 211/126.1; 248/129
[58] Field of Search ............................. 280/47.18, 47.27, 280/47.17, 47.34, 47.35, 79.2, 30, 654, 47.19, 47.26, 47.29, 47.28, 651, 652, 655, 655.1, 47.24, 47.371; 248/98, 129; 211/71.01, 126.4, 126.1; 220/9.1, 9.4, 666, 668; 206/216

[56] References Cited

U.S. PATENT DOCUMENTS

| | | | |
|---|---|---|---|
| 579,030 | 3/1897 | Yerby | 220/9.1 |
| 2,008,176 | 7/1935 | Fritsche | 150/49 |
| 2,020,766 | 11/1935 | Brown | 150/49 |
| 2,466,149 | 4/1949 | Burg | 280/57 |
| 2,625,973 | 1/1953 | Weldon et al. | 150/1 |
| 2,873,458 | 2/1959 | Adamson | 5/98 |
| 2,938,748 | 5/1960 | Johnson | 296/27 |
| 3,079,168 | 2/1963 | Monroe et al. | |
| 3,168,329 | 2/1965 | Goldschmidt | |
| 3,281,159 | 10/1966 | Levy | 280/47.26 |
| 3,743,122 | 7/1973 | Fortriede | 414/392 |
| 3,785,669 | 1/1974 | Doheny | |
| 3,997,182 | 12/1976 | Mortenson | 280/47.27 |
| 4,185,853 | 1/1980 | Thurmond, Jr. | |
| 4,284,286 | 8/1981 | Lewallen | 280/30 |
| 4,362,308 | 12/1982 | Hicks et al. | 280/30 |
| 4,530,510 | 7/1985 | Driggers | 280/47.17 |
| 4,531,752 | 7/1985 | Diener | 280/47.18 |
| 4,826,187 | 5/1989 | Abbott et al. | 280/35 |
| 4,915,329 | 4/1990 | Doninger | |
| 4,917,393 | 4/1990 | Rogers | 280/47.28 |
| 5,154,359 | 10/1992 | Junta et al. | |
| 5,228,716 | 7/1993 | Dahl | 280/651 |
| 5,265,892 | 11/1993 | Said | 280/30 |
| 5,536,034 | 7/1996 | Miller | |
| 5,775,865 | 7/1998 | Capilupi, Jr. | 414/498 |

Primary Examiner—Lanna Mai
Assistant Examiner—Bridget Avery
Attorney, Agent, or Firm—Reising, Ethington, Barnes, Kisselle, Learman & McCulloch, P.C.

[57] ABSTRACT

A hand truck with a load carrying nose plate usable as a two-wheeled product transporter, and alternatively as a carrier for a fabric receptacle has a two-wheel supported frame assembly mounting a nose plate to project generally perpendicularly. A support assembly connected to the base end of the main frame assembly provides an extension projecting parallelly outwardly beyond the nose plate. A generally rigid receptacle suspension frame system from which the fabric receptacle depends has a device thereon for demountably supporting the outer end of the suspension frame system and a support part on the main frame assembly demountably interfits with and carries the opposite inner end of the suspension frame system. The hand truck in several versions is a convertible hand truck usable in four-wheeled as well as two-wheeled configuration.

18 Claims, 8 Drawing Sheets

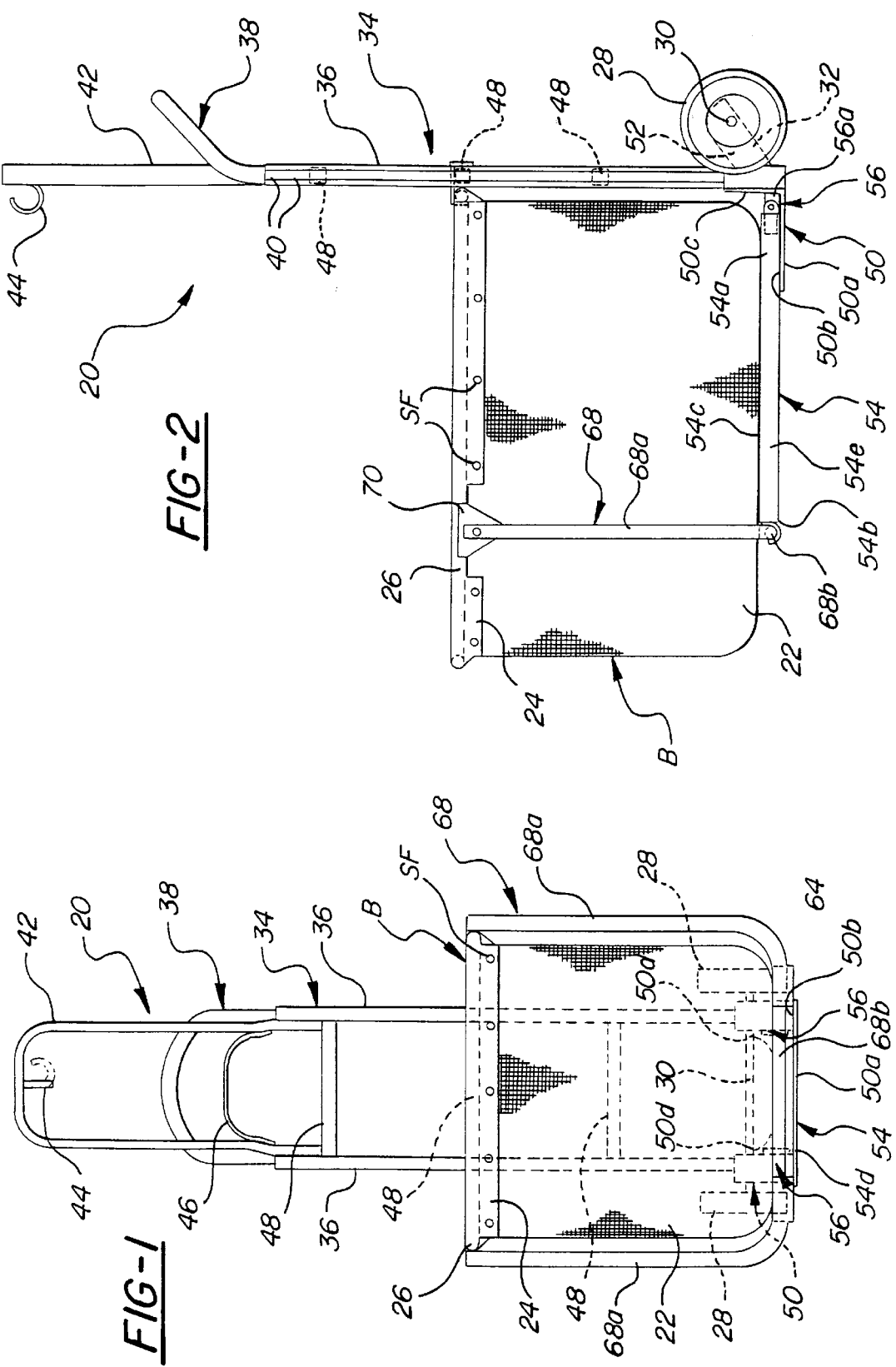

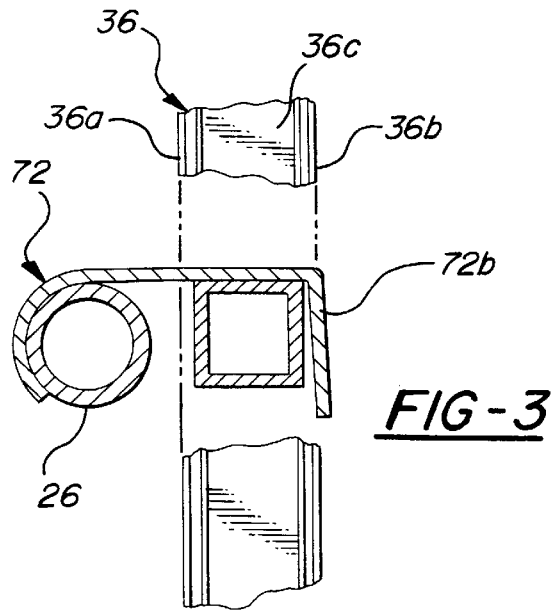
FIG-3
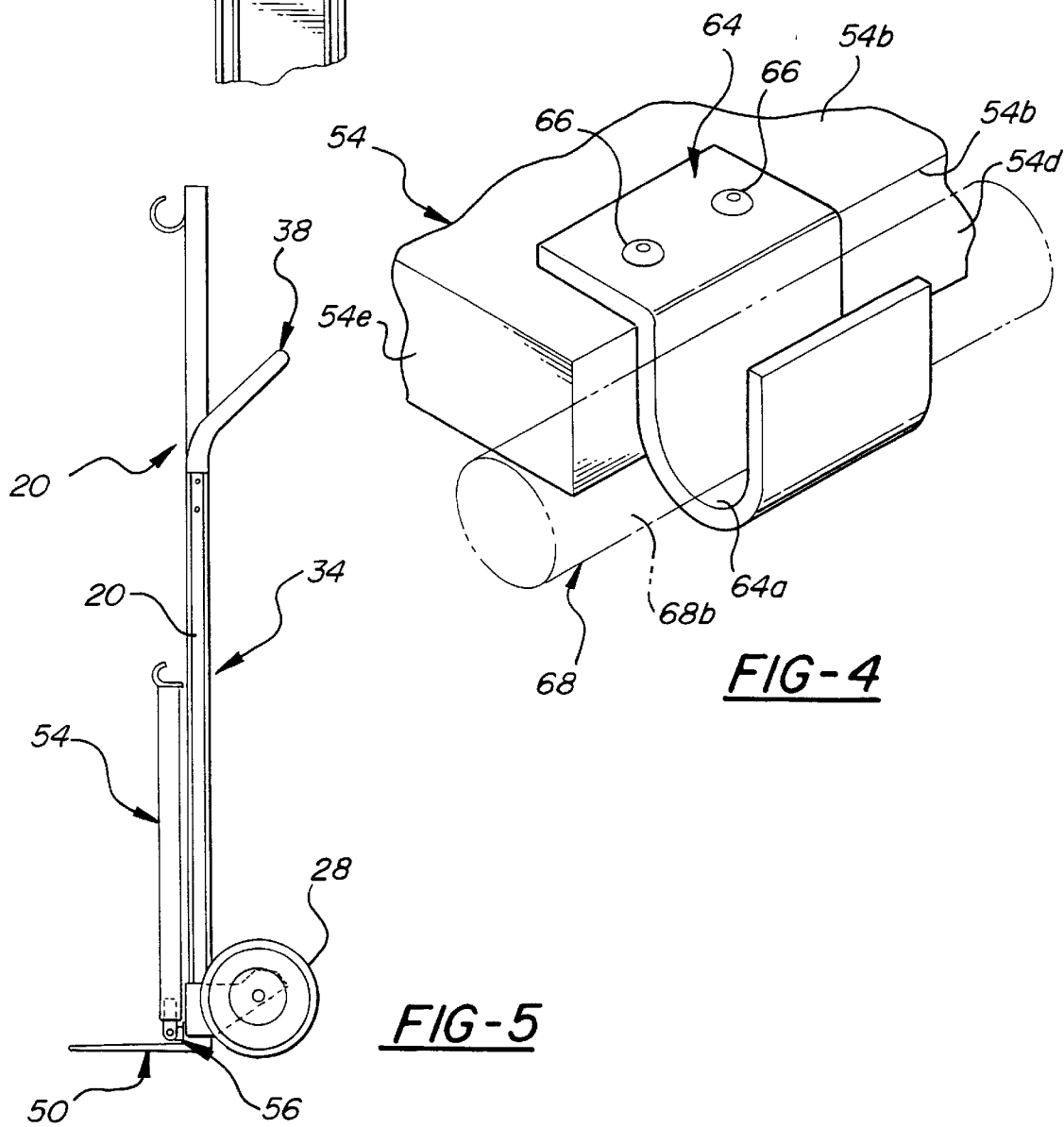
FIG-4
FIG-5

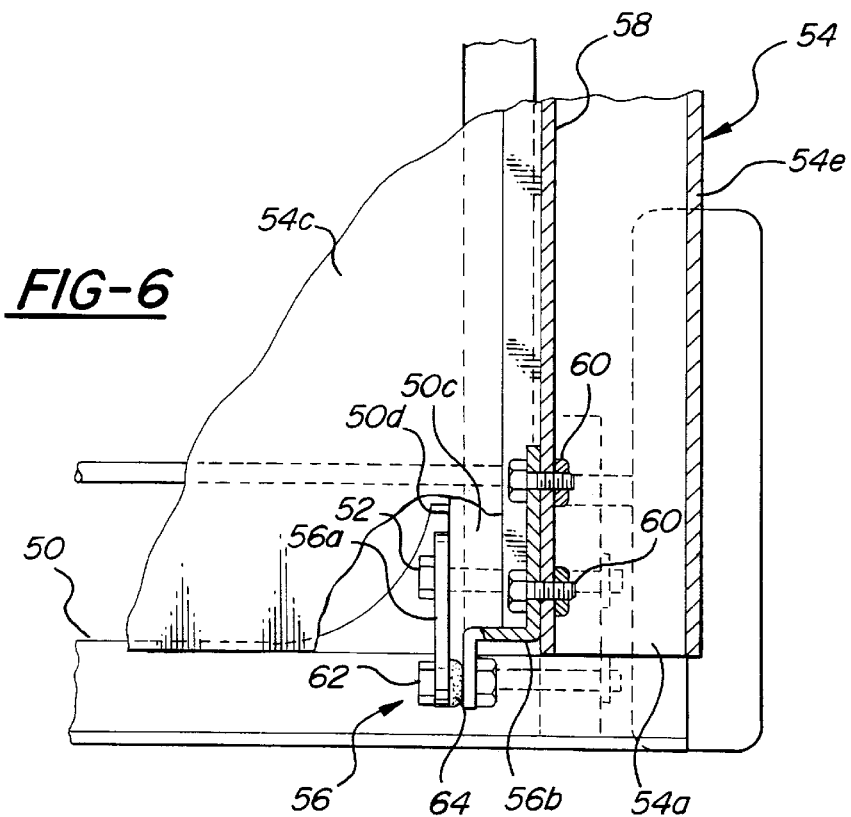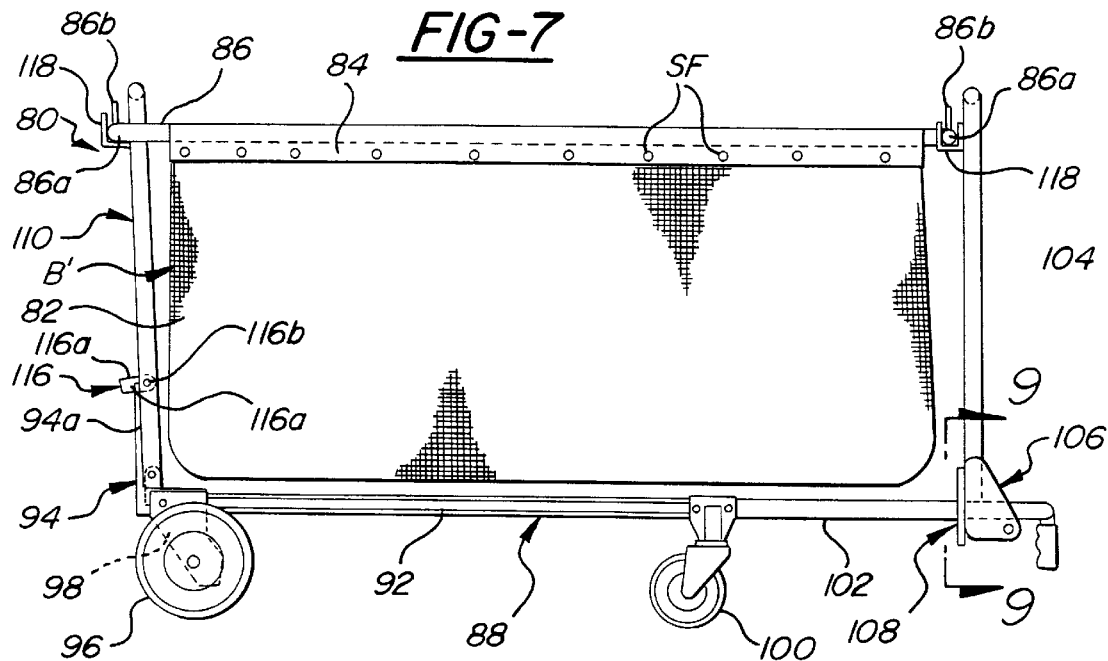

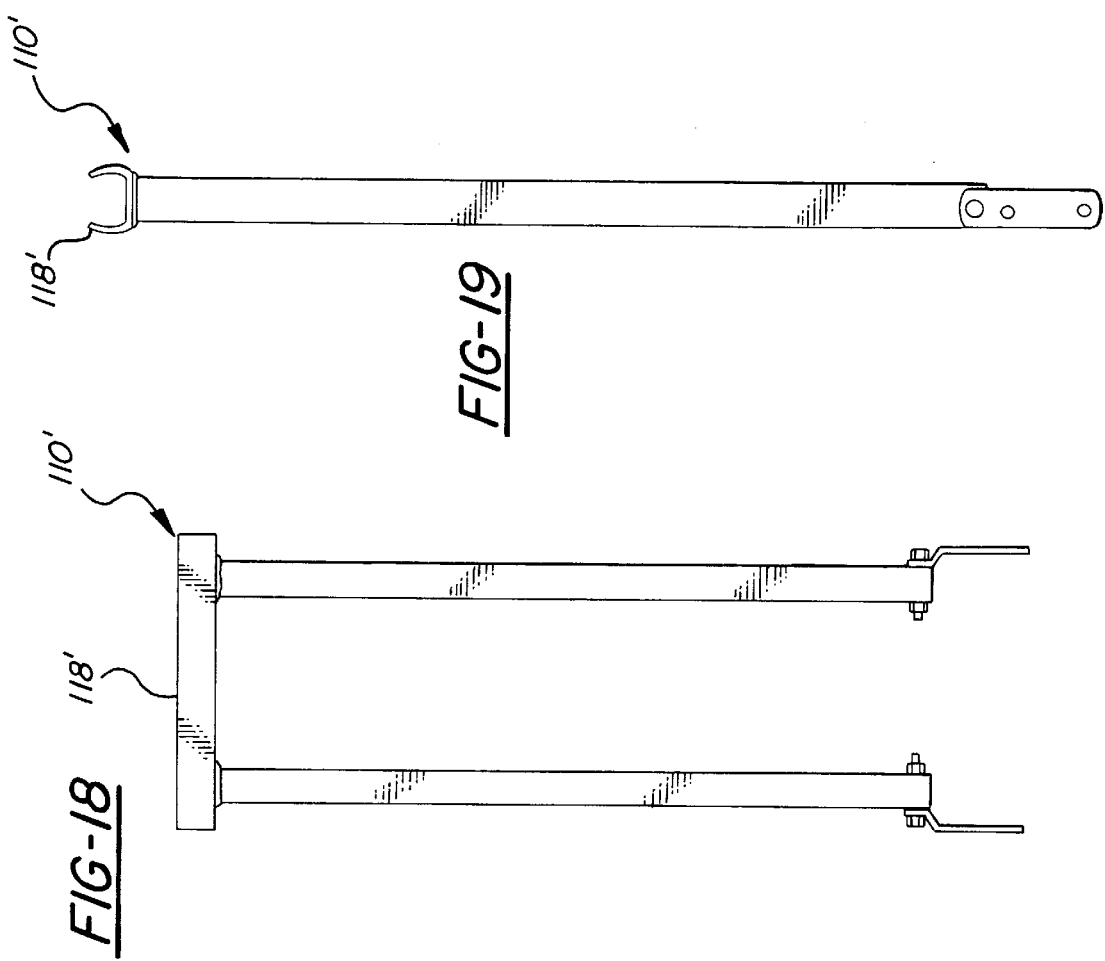
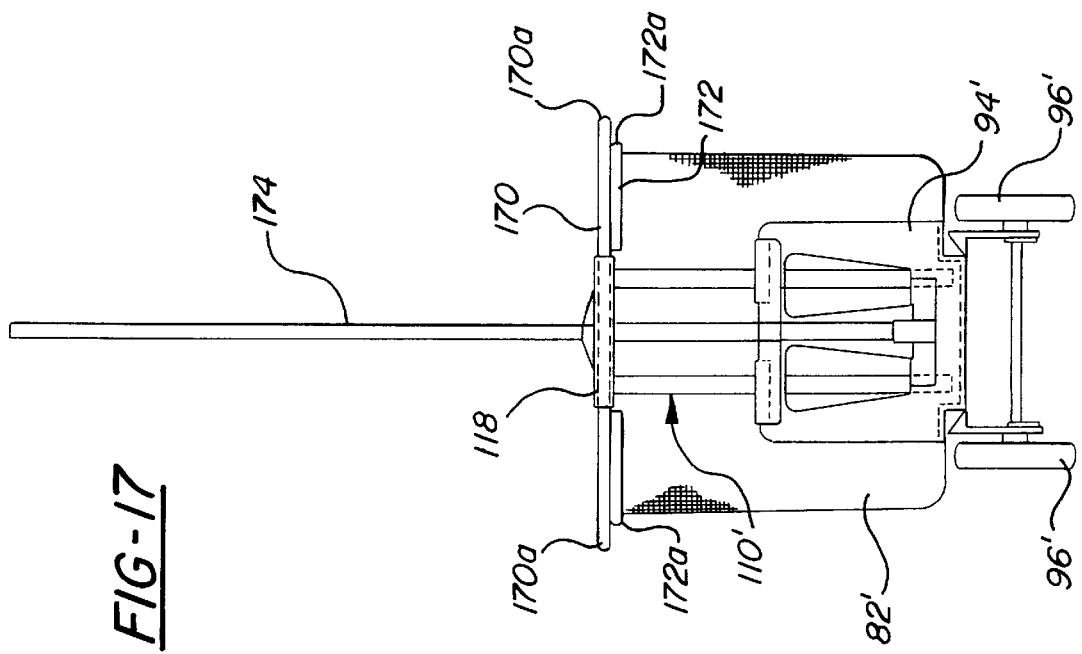

MULTIPLE USE HAND TRUCKS FITTED TO CARRY LAUNDRY BASKETS

This application claims the benefit of U.S. Provisional Application No. 60/015,600 filing date Apr. 18, 1996.

This invention relates to multi-use hand trucks and particularly those adapted according to the invention for transporting commercial/industrial laundry baskets as well as for normal hand truck use. The invention is disclosed in provisional application, Serial No. 60/015,600, filed Apr. 18, 1996, and the priority of this application is claimed.

BACKGROUND OF THE INVENTION

Laundry baskets used to transport linens and the like usually consist of a large canvas bag supported about its open top by a rigid frame. When loaded, such baskets can be quite heavy, making them difficult for personnel to move any substantial distance by hand. Accordingly, some baskets are equipped with a dedicated wheeled frame structure which facilitates transport, but adds significant cost and complexity to their construction. Since, it is desirable to collapse the basket when not in use for compact storage, the added bulk and weight of such wheeled frame structures detracts from this attribute.

SUMMARY OF THE INVENTION AND ADVANTAGES

The present invention is concerned in embodiments with a convertible hand truck, usable in two-wheeled as well as four-wheeled configuration, which is fitted with support structure or mount systems for releasably mounting industrial/commercial type laundry baskets in such manner as to enable them to be transported about in a safe and efficient manner by a sole operator.

According to another embodiment of the present invention, the hand truck is generally of conventional two-wheeled dolly construction having a main frame assembly with side rails and cross braces, and a nose piece at the base of the frame side rails presenting a forwardly projecting nose plate. In accordance with this embodiment of the present invention, a platform or support assembly rests on the nose piece and projects forwardly beyond the nose plate to a free end which releasably mounts a hanger or socket to receive and support a suspension frame system or framework having a dependent vertical brace supporting the laundry basket adjacent its front end. A pair of hooks are secured to a rear portion of the laundry basket suspending framework to releasably engage a cross brace of the hand truck frame and conjunctionally support the basket in an open, laundry receiving condition.

According to a further feature of this embodiment of the present invention, the platform is hinged to the nose piece enabling it, when the basket is detached, to be folded to a stowed position against the side rails of the truck frame to facilitate use of the hand truck to transport other loads such as cartons, as well as to facilitate compact storage of the truck when not in use.

According to the preferred embodiments of the present invention, the hand truck may be of a convertible hand truck construction, having a main frame assembly nose piece, and a foldable secondary handle piece, which is convertible between a two-wheeled dolly configuration and a four-wheeled cart configuration wherein the main frame assembly is horizontally disposed and the secondary handle thereof is releasably locked in an upright generally vertical position providing an end wall for the cart. According to the present invention, a platform support assembly is secured preferably by a hinge linkage to the nose piece of the truck and, with the truck in four wheel configuration, is supportable in an upright position to provide an opposite end wall for the cart. Releasable mounting structure is provided on the end walls of the cart for engagement with the rigid top suspension frame of the fabric laundry basket to support it releasably in position between the end walls.

According to a particular embodiment of the present invention, the mounting structure on the end walls is in the form of U-shaped channels open upwardly to receive and support opposite ends of the laundry basket suspension frame system.

According to another particular embodiment of the present invention, the mounting structure comprises sockets provided on the end walls to receive the ends of the projecting side rails of the laundry basket framework.

According to a further feature of the present invention, the platform support assembly of the convertible hand truck is foldable to a stowed position against the side rails to facilitate use of the hand truck in two wheeled configuration and compact storage of the truck when it is not in use.

These and other objects, advantages and features of the present invention will become more apparent from the following detailed description when taken together with the accompanying drawings wherein:

BRIEF DESCRIPTION OF THE DRAWINGS

FIG. 1 is a front elevational view of a two-wheeled hand truck constructed in accordance with a first presently preferred embodiment of the invention;

FIG. 2 is a side elevational view of the hand truck of FIG. 1;

FIG. 3 is an enlarged, fragmentary, side sectional view illustrating features of the laundry basket mounting system;

FIG. 4 is an enlarged, fragmentary, perspective plan view illustrating additional features of the laundry basket mounting system;

FIG. 5 is a side view of the hand truck showing the platform folded to the stowed position;

FIG. 6 is an enlarged fragmentary front elevational view of a lower portion of the hand truck shown with the platform folded to the stowed position;

FIG. 7 is a side elevational view of a convertible bulk hand truck in the four-wheeled cart configuration according to another embodiment of the invention, shown supporting a laundry basket;

FIG. 16 is a top view of the hand truck of FIG. 15;

FIG. 17 is a side elevational view of the hand truck of FIG. 15; and

FIGS. 18 and 19 are front and side elevation views of an alternative construction for the nose plate extension.

DETAILED DESCRIPTION

Figure 8:
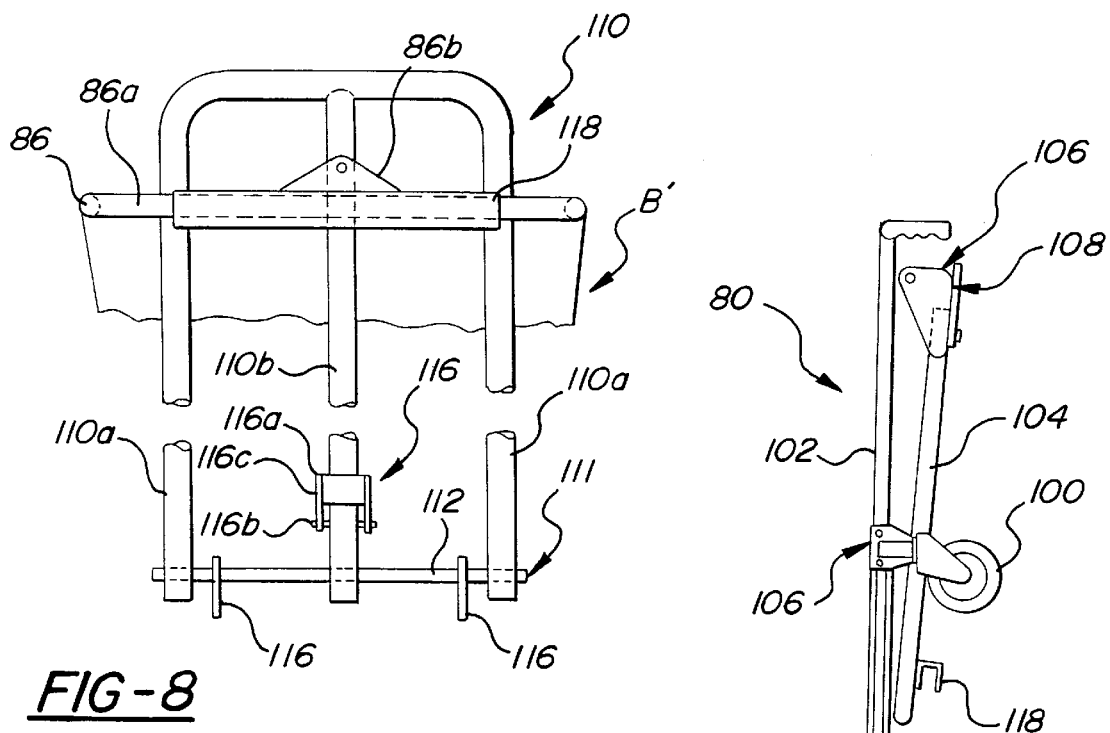
FIG. 8 is an enlarged, fragmentary, front elevational view of one of the basket supporting elements shown in FIG. 7.

Referring now in more detail to the drawings, a two-wheeled hand truck assembly 20, constructed in accordance with a first embodiment of the invention, is illustrated in FIGS. 1 and 2 as mounting a removable laundry basket or receptacle B of the commercial/industrial type. The basket B depicted is a large open-topped bag 22 fabricated of canvas or other heavy cloth material and secured about its open top by releasable folded over flaps 24 to a rigid tubular suspension frame system or frame assembly 26 from which the bag 22 suspends.

The hand truck 20 is of the general character disclosed in U.S. Pat. No. 3,997,182, commonly owned by the assignee of the present invention, and its disclosure is incorporated herein by reference. The hand truck 20 includes a pair of laterally spaced wheels 28 mounted by an axle 30 and brackets 32 to the rear of the main frame or main frame assembly 34 of the truck 20. The frame 34 includes a pair of vertical side rails 36 which are preferably channel-shaped metal extrusions opening laterally inwardly of the frame and including spaced apart front and back walls 36a, 36b, connected by a web 36c, as illustrated in FIG. 3. The side rails 36, at their upper ends, receive the legs of a bale-shaped handle member, generally designated 38, which may be secured in position by fasteners 40, such as nut and bolt assemblies or the like. The handle 38 provides a handle surface, as does the upper end of frame 34 which may be aptly called the head or handle end, the lower end being termed the base end.

Extending above the handle 38, is a U-shaped frame extension piece 42 fitted with a hanger hook 44 extendable forwardly of the frame piece 42 (solid lines in FIGS. 1 and 2) to support clothing on hangers, and foldable into the plane of the frame piece 42 (broken chain lines in FIGS. 1 and 2) when not in use. A U-shaped brace 46 is provided inboard of the extension piece 42 for added strength and rigidity and is secured along with the extension piece 42 to the side rails 36 by the same fasteners 40 that mount the handle 38. A plurality of vertically spaced cross braces or rails 48 extend between and interconnect the side rails 36.

Projecting forwardly from the main frame 34 and forming a part thereof is an angle-shaped nose piece, generally designated 50, having a forwardly extending nose plate portion 50a with an upper load-supporting surface 50b. Rear facial portions 50c of the nose piece abut the front surface 36a of the side rails and inward side portions 50d abut laterally inner sides of the side rails 36 within a rearwardly recessed region of the nose piece 50 and may be secured to the rails 36 by the same fasteners 52 which are used to secure the brackets 32 to the laterally outer sides 36c of the rails 36.

Apart from the frame extension 42 and hanger hook 44 features which form no part of the present invention, the hand truck 20 described thus far is of conventional construction.

Basket support system modifications to the truck 20 include mounting structure provided for removably mounting the laundry basket B on the truck 20. The mounting structure includes a platform or support assembly 54 mounted preferably by hinge linkages 56 to the main frame assembly nose piece 50 at one end 54a thereof and projecting forwardly beyond the nose plate 50a to a free end 54b. The platform 54 may be fabricated from metal plate material such as aluminum, and formed to include a continuous top portion 54c and front 54d, and side 54e skirt portions (FIG. 6). A pair of C-shaped support elements 58 may be secured to the underside of the platform, as illustrated in FIG. 6, for added strength and rigidity and to provide a location for attachment of the hinge linkages 56.

As illustrated best in FIGS. 2 and 6, each hinge linkage 56 includes an L-shaped fixed bracket 56a anchored to the side portions 50d of the nose piece 50 by the fasteners 52, the other leg of which projects projecting forwardly beyond the rear facial portions 50c of the nose piece 50. Swing arm brackets 56b are attached at one end to the support elements 58 such as by fasteners 60, and are coupled pivotally at their opposite ends to the projecting legs of the fixed brackets 56a by a pivot connection such as the illustrated nut and bolt fastener assembly 62. The platform support assembly 54 is swingable relative to the truck frame 34 between a generally horizontally disposed load-supporting position, illustrated in FIGS. 1 and 2, and a stowed position, illustrated in FIG. 5, wherein the platform 54 is folded upwardly to a generally vertical position against the rails 36. Belleville washers 64 may be installed between the brackets 56a, 56b to provide sufficient frictional resistance to hinging to retain the platform 54 in the stowed position. Of course, other frictional or latching devices could also be used for this purpose.

Mounting brackets 64 are secured such as by rivets 66 to the front of the platform 54 adjacent either side thereof. The brackets 64 have upwardly opening U-shaped channel or socket portions 64a supported forwardly of the free end 54b of the platform.

The framework or suspension frame system 26 of the laundry basket B in this embodiment includes a U-shaped support brace 68 having leg portions 68a secured at their upper ends by brackets 70 to the suspension framework 26 of the basket forward of center and extending downwardly therefrom along opposite sides of the bag 22 where they merge in a connecting portion 68b extending crosswisely beneath the bag 22. The rearward end portion of the suspension frame system 26 incorporates a pair of hangers 72 (FIG. 3) which extend rearwardly and terminate in downwardly turned hook-shaped free end portions 72b.

To mount the laundry basket B on the hand truck 20, the connecting portion 68b of the support legs of brace 68 is dropped down into the channels 64a of the mounting brackets 64 to interfit therewith and support the front or outer portion or end of the laundry basket. The free ends 72b of the hanger 72 are extended through the open frame 34 of the truck 20 and lowered into engagement with an associated one of the cross braces or rails 48 of the truck frame 34 to interfit with that cross rail and support the back or inner end of the laundry basket B. Once mounted, the basket B can be transported about in top open position by rocking the truck 20 back on its wheels 28, with the hangers 72 preventing the basket B from tipping forwardly off the platform 54. The basket B may be unloaded by simply lifting it free of the truck 20. Snap fasteners SF may be released to permit removal of the fabric bag from the bag suspension framework 26 so that the bags may also be laundered.

It should be noted that the legs of the support braces 68 may be pivoted to the brackets 70, allowing the brace to be folded rearwardly against the basket frame 26 to facilitate normal use of the hand truck and compact storage of the basket when not in use.

FIGS. 7 through 10 illustrate an alternative presently preferred embodiment of the invention wherein a conventional convertible bulk hand truck 80 is shown fitted with mounting structure for releasably mounting a similar large industrial/commercial laundry basket or receptacle B' which includes a fabric bag 82 mounted detachably by folded over snap-retained flaps 84 to a receptacle suspension frame system 86 perimetrally extending to support the open top of the bag or receptacle. The frame system 86, in this case, includes end portions 86a forwardly outboard of the bag 82 which are fitted with collapsible hinge couplings 86b, enabling the suspension frame or frame system 86 to be folded in halves, when not in use, for compact storage.

The convertible hand truck 80 includes a nose plate carrying main frame or main frame assembly 88 constructed generally the same as that of the main frame assembly 34 of the first embodiment, including side rails 92 joined by cross braces 93 and coupled at their base to a nose piece 94 having a forwardly projecting nose plate 94a. A set of primary wheels 96 are similarly mounted by brackets 98 to the base of the frame. A set of secondary caster wheels 100 are also mounted on the main frame 88 assembly. A U-shaped tubular handle piece 102 is secured to the rails 92 and forms a part of the main frame assembly.

Figure 10:
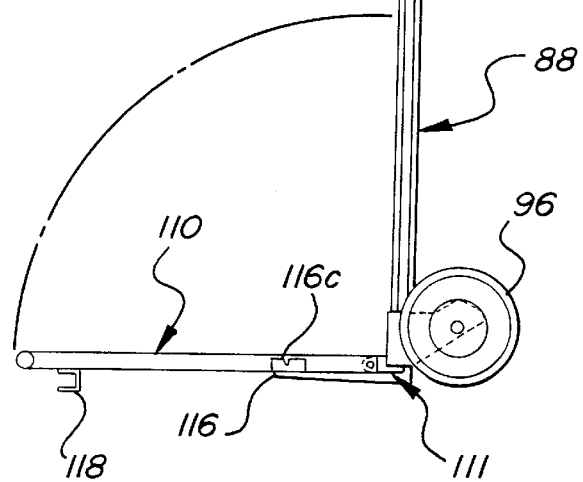
FIG. 10 is a side elevational view of the cart of FIG. 7 shown converted to two-wheeled dolly configuration.
Figure 9:
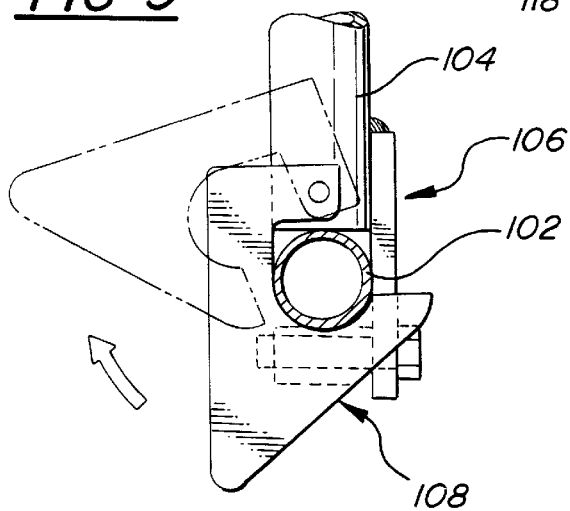
FIG. 9 is an enlarged, sectional view taken along the lines 9—9 of FIG. 7.

The main frame assembly also includes a secondary handle or subframe 104 having a U-shaped tubular construction connected by pivot linkages 106 adjacent the upper end of the primary handle 102, enabling the subframe handle 104 to pivot relative to the handle 102. As illustrated in FIG. 7, when the main frame assembly 88 is horizontally disposed in a four-wheeled cart configuration, its secondary handle 104 may be pivoted to an upright generally vertical position and secured in the upright position by locking mechanism 108 (FIG. 9) to provide a front end wall for the four wheeled cart conversion. When the main frame assembly 88 is vertically disposed in a two-wheeled dolly configuration, as illustrated in FIG. 10, the handle or subframe 104 may be pivoted to a stowed position generally parallel to the side rails 92 to facilitate normal use of the hand truck and compact storage of the hand truck 80.

The hand truck 80 also includes a platform extension or support assembly 110 secured at its base preferably by a hinge linkage 111 to the nose piece 94. The hinge linkage 111 preferably comprises an axle 112 extending through side legs 110a and a center post 110b of the platform 110, and supported by L-shaped brackets 116 which are generally the same as the L-shaped brackets 56a of the first embodiment. As illustrated in FIGS. 7 and 8, when the main frame assembly 88 is disposed in the four-wheeled cart configuration, the support assembly platform 110 may be pivoted to an upstanding, generally vertical position and further may be locked in place by locking mechanism 116 to provide an opposite end wall for the cart. The locking mechanism 116 may comprise a latch arm 116a coupled by a pivot pin 116b to the center post 110b of the platform and notched at 116c for engaging the forward edge of the nose plate 94a to lock the support assembly platform 110 in place. When not in use, the platform 110 may likewise be folded to a stowed position against or within the frame side rails 92.

As illustrated in FIGS. 7 and 8, elongated mounting brackets or sockets 118, for mounting or suspending the laundry basket or receptacle B', are secured to the secondary handle or subframe 104 and support assembly platform 110, respectively, adjacent their upper free ends. The brackets 118 preferably have a U-shaped channel construction extending crosswise to the handle 104 and support assembly platform 110 in an orientation to present generally horizontal upwardly opening channels. The lateral spacing between the brackets 118 corresponds to the distance between the front and back end portions 86a of the basket suspension frame system 86. The laundry basket B' is mounted on the hand truck 80 by simply dropping the end portions 86a of the basket framework 86 into the channels or sockets 118 as illustrated in FIG. 7. The basket B' may be dismounted from the truck 80 by simply lifting the suspension framework 86 free of the channels 118.

While forming no part of the present invention, it is to be understood that upright tube sockets may be provided on the upper ends of members 110 and 104 to releasably support a garment hanger rod which has legs releasably received in the tube sockets.

Another embodiment of a convertible bulk hand truck 130 fitted for carrying another style of industrial/commercial laundry basket B" is illustrated in FIGS. 11–14. The laundry basket B", in this case, includes a large fabric bag or receptacle 132 with a pair of sleeve sections 134 on opposite lateral sides of the open top of the bag in which a pair of elongate frame elements 136, constituting the rigid basket suspension frame system or framework, are accommodated. End portions 136a of the tube elements 136 project outwardly of the sleeves 134 beyond the bag 132.

Figure 11:
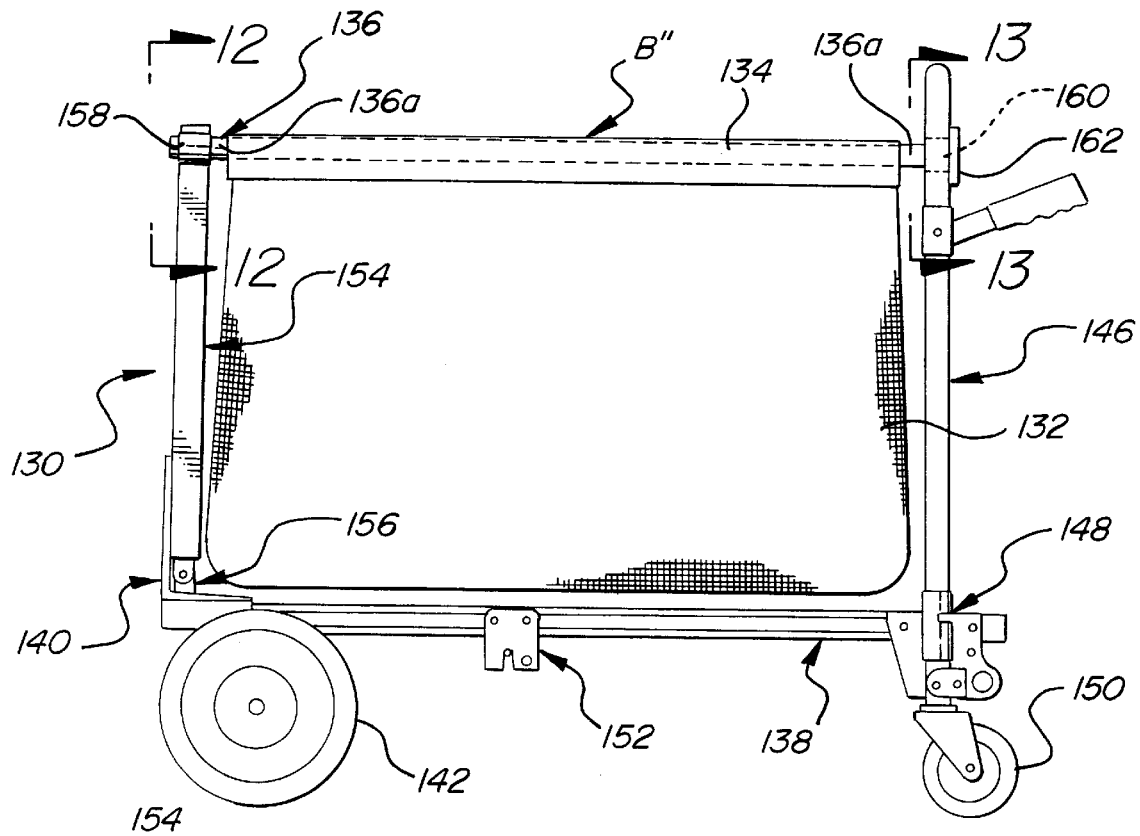
FIG. 11 is a side elevational view of a convertible bulk hand truck constructed in accordance with another embodiment of the invention, the hand truck being shown in the four-wheeled cart configuration and supporting a laundry basket.
Figure 14:
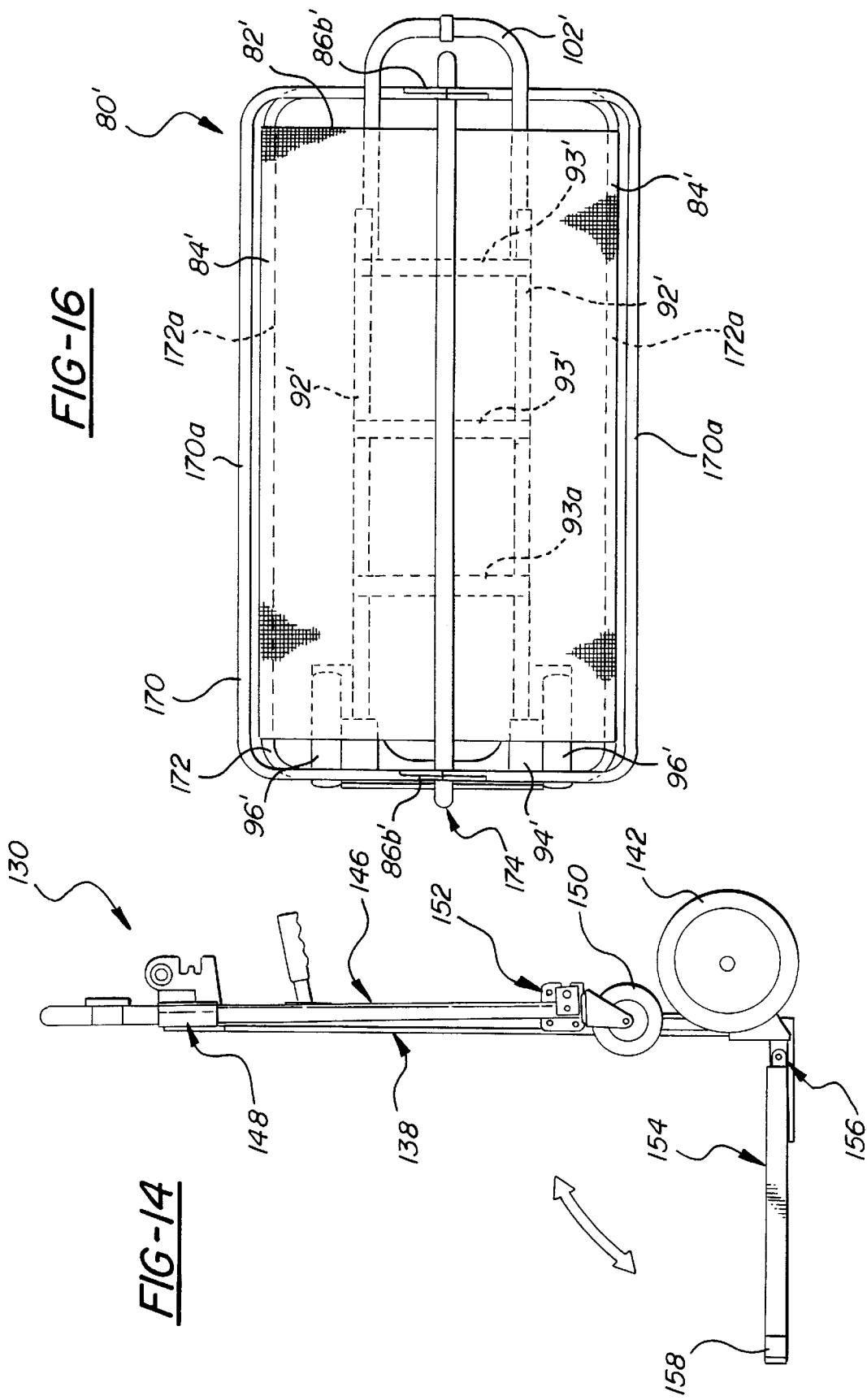
FIG. 14 is a side elevational view of the cart of FIG. 11 shown in the two-wheeled dolly configuration.

The convertible bulk hand truck 130 of this embodiment is of the general character disclosed in U.S. Pat. 3,785,699, which is incorporated herein by reference, and has a main frame assembly which includes a nose plate carrying frame 138, fitted at its lower base end with a nose plate 140 which corresponds substantially to that of the nose piece 50 of the first embodiment. A pair of primary support wheels 142 are similarly mounted by brackets to the nose plate carrying frame 138. A generally U-shaped subframe or secondary handle 146 included as part of the main frame assembly has spaced legs 146a which are coupled by a sliding pivot linkage 148 to the upper end of the frame 138 and which carry at their lower free ends a pair of secondary caster wheels 150. The pivot linkage 148 enables the hand truck 130 to be positioned in a four-wheeled cart configuration, as shown in FIG. 11, wherein the frame 138 is disposed horizontally and the secondary handle 146 is locked by the pivot linkage 148 in an upright and generally vertical position. The truck 130 is convertible also to a two-wheeled dolly configuration, as illustrated in FIG. 14, wherein the frame 138 is disposed vertically and the secondary handle 146 is secured by locking mechanisms 152 in a stowed position flush with the frame 138. Details concerning the construction and operation of the pivot linkages 148 and locking mechanisms 152 form no part of the present invention and a greater understanding of their operation can be had by reference to the aforementioned '669 patent.

A support assembly or platform extension piece 154, corresponding substantially to the platform 54 of the first embodiment, is preferably hinged to the frame 138 in substantially the same manner by a pivot linkage 156 like that employed in the first embodiment. Accordingly, the foregoing description pertaining to the construction and operation of the support assembly platform 54 and pivot linkage 56 of the first embodiment are equally applicable to the support assembly platform 154 and hinge coupling 156 of the present embodiment.

Figure 12:
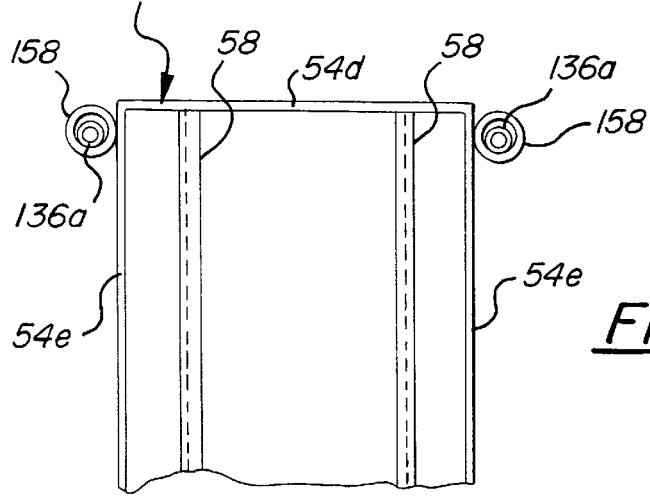
FIG. 12 is an enlarged fragmentary end elevational view taken generally along the lines 12—12 of FIG. 11.

The bag suspension framework mount system incorporates a pair of tubular sockets 158, secured to the opposite lateral sides of the support assembly platform 154 adjacent its upper free end by welding or any other well known securing means, which are generally coextensive with the width of the platform 154, as illustrated in FIGS. 11 and 12. The secondary handle 146 is fitted with a corresponding pair of U-shaped channels or sockets 160, supported on the outboard sides of the legs 146a of the handle 146 by a transverse brace piece 162 fixed by welding or other suitable securing means to the handle 146, as illustrated best in FIG. 13.

Figure 13:
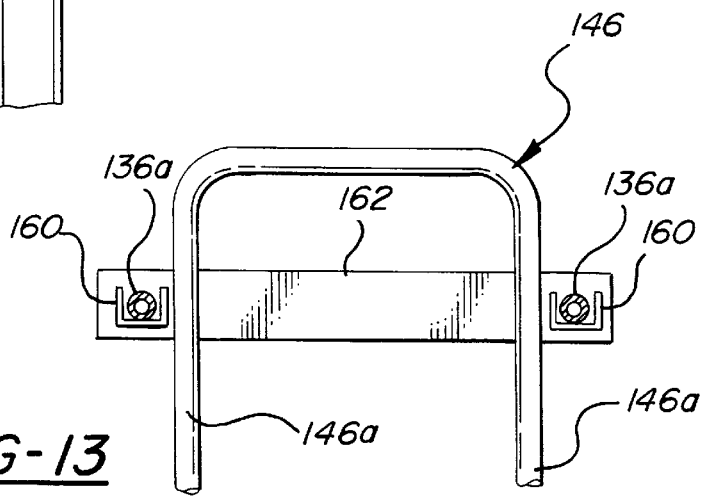
FIG. 13 is an enlarged fragmentary end elevational view taken along the lines 13—13 of FIG. 11.

To mount the laundry basket B" on the cart 130, the end portions 136a of the receptacle suspension framework 136 at the front of the basket B" are slid into the sockets 158 and the end portions 136a at the other end of the basket suspension frame system are dropped down into captured position within the channels or sockets 160, as illustrated in FIGS. 12 and 13, respectively. The reverse operation is performed to dismount the basket B".

FIGS. 15–19 illustrate another embodiment of the general hand truck assembly described previously with respect to FIGS. 7–10. Like reference numerals are used to indicate like features, but are primed.

The platform extension 110' of the hand truck 80' is similarly hinged to the nose piece 94' at its base end, but is constructed to fold into the frame of the hand truck between the side rails 92' when stowed. When extended, it operates in much the same manner as the platform extension 110 of FIGS. 7–10. This embodiment, however, lacks the latch mechanism 116a of FIGS. 7–10 and instead the extension 110' is held upright by the rigid suspension frame 86 of the basket which is fixed against longitudinal movement by engagement with the channel 118 of the secondary handle 104 and at one end, and operates to brace the platform extension 110' in its upright position by engagement with the other channel 118' of the platform extension. The same latchless upright support system could be utilized in the embodiment of FIGS. 7–10.

Figure 15:
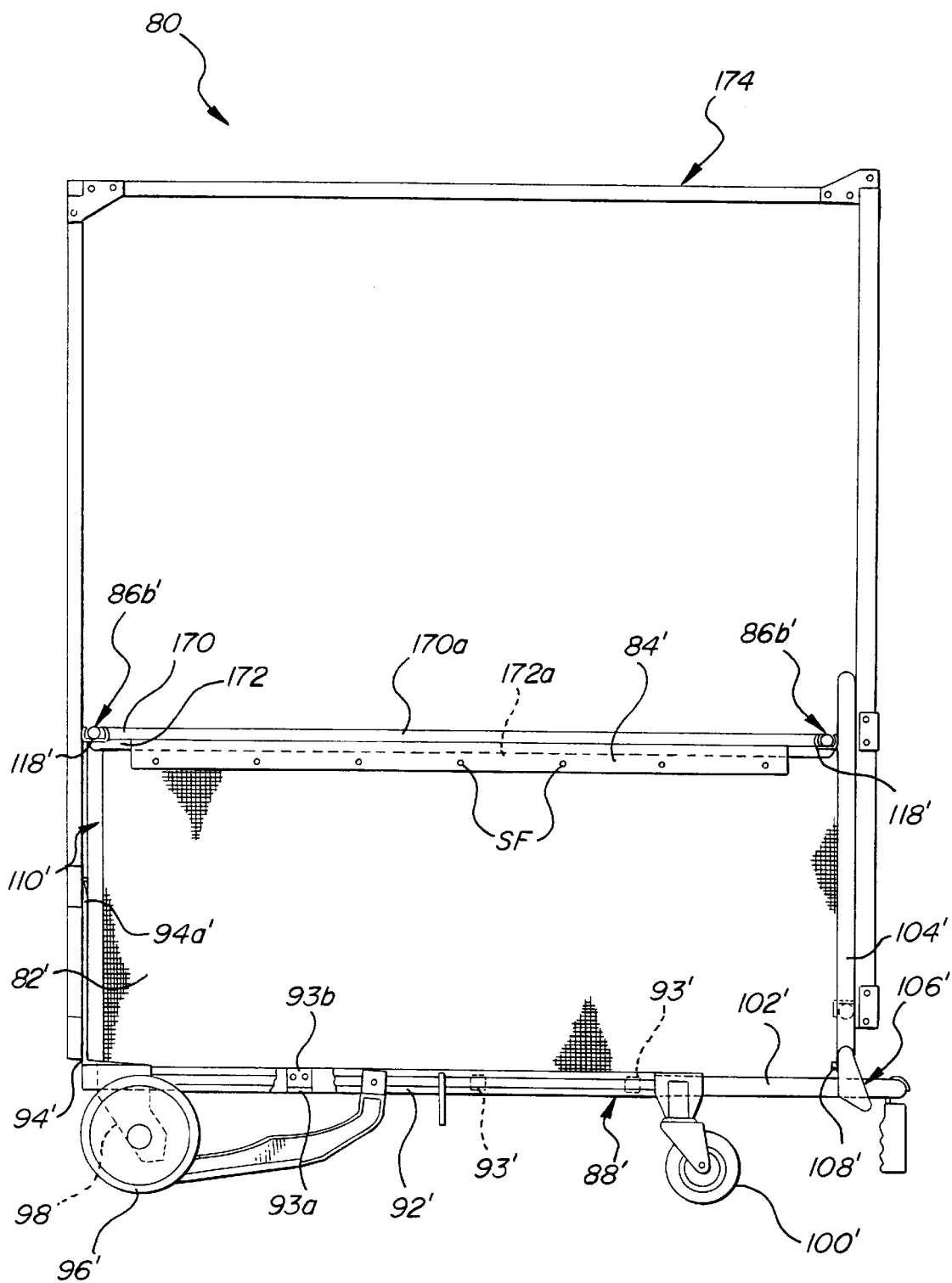
FIG. 15 is a front elevational view of a further embodiment of the invention.

The nested folding of the platform extension 110' into stowed position between the side rails 92' is accommodated by constructing the extension 110' sufficiently narrow to fit between the rails when folded, and further the length of the extention 110' is taken into consideration when locating the cross members 93' of the main frame 88', such that the extension 110' is able to clear such cross braces 93'. As illustrated in FIG. 15, the lowermost brace 93a is recessed to the back of the rails 92' and joined at its opposite ends to the rails 92' by forwardly projecting mounting flanges 93b.

Another primary difference between the embodiments of FIGS. 15–20 and that of FIGS. 7–10 is the construction of a receptacle suspension frame system 86'. As shown best in the top view of FIG. 16, the frame system 86' is provided with generally U-shaped outboard guard rail portions 170 joined together by a similar hinge coupling 86b' as that of FIGS. 7–10. A set of inboard rails 172 are fixed to the outboard rails 170, such as by welding the rails together, with longitudinal portions 172a of the inboard rails 172 being spaced laterally inwardly of adjacent longitudinal portions 170a of the outboard rails 170. The receptacle or bag 82' is attached via snap-retained flaps 84' to the inset rail portions 172a, such that the outboard rails 170 protect the bag 82' from rubbing against doorway frames and the like when moving the hand truck 110' about.

The embodiment of FIGS. 15–20 further includes an optional garment rod 174 that mounts by hanger brackets on the cross members of the secondary handle 104' in the nose piece 94'.

Based on the foregoing description, those skilled in the art will recognize that there are numerous other ways to mount commercial/industrial laundry baskets of the general type described and that the exact arrangement will depend to a large degree on the type and style of the hand truck utilized and the particular style of the laundry basket to be supported. It is to be understood, therefore, that the disclosed embodiments are representative of presently preferred forms of the invention and other embodiments of the invention which accomplish the same function are incorporated herein within the scope of any ultimately allowed patent claims.

I claim:

1. In a convertible hand truck with a load carrying nose plate usable as a two wheeled product transporter and alternatively as a converted carrier with additional secondary wheel support, the hand truck having an elongate main frame assembly with a head end and a base end incorporating a nose plate projecting generally perpendicularly from said base end; an axle assembly with a pair of wheels thereon joined to said base end of said main frame assembly; handle surface for the head end of the main frame assembly, and an elongate subframe having a head end and base end; a coupling assembly mounting the subframe on said main frame assembly to permit said main frame assembly to be shifted from a generally vertical disposition generally paralleling said subframe when the said main frame assembly is in two-wheeled cart configuration to a generally horizontal position generally perpendicular to the subframe, and a secondary wheel system supporting the hand truck when it assumes the generally horizontal position, the improvement comprising:

a. a support assembly supported by said base end of the main frame assembly providing an extension projecting outwardly generally perpendicularly to said elongate main frame assembly and having an outer end extending beyond said nose plate;

b. a receptacle suspension frame system having outer and inner ends and including a depending fabric receptacle; the said support assembly having a device thereon adjacent an outer end thereof demountably supporting an outer end of said suspension frame system; and c. said subframe including a suspension part carrying said inner end of said suspension frame system.

2. The hand truck of claim 1 wherein said suspension frame system has side and end sections and includes laterally spaced support legs extendable generally perpendicularly to said support assembly, said device comprising an upwardly opening socket demountably receiving said suspension system support legs.

3. The hand truck of claim 1 wherein said main frame assembly has elongate laterally spaced side rails connected by lateral cross rails.

4. The hand truck of claim 1 wherein said fabric receptacle has perimetral loops at its upper end demountably receiving portions of said suspension frame system.

5. The hank truck of claim 1 wherein said secondary wheel system comprises a pair of wheels and said suspension frame system mounting and support part comprises a socket on said subframe receiving the inner end of a said suspension frame system when said hand truck is in four wheeled configuration.

6. The hand truck of claim 1 wherein said receptacle suspension frame system comprises a foldable frame having inward longitudinally extending rail portions mounting said fabric receptacle and outward guard portions spaced laterally outwardly of said inward rail portions for guarding said fabric receptacle.

7. The hand truck of claim 1 wherein a latch mechanism being carried on one of said support assembly extension and said nose plate is interactable with the other to latch said extension to the nose plate; said nose plate terminates in a free edge, and said latch mechanism comprises a pivotal latch carried on said extension and having a notch therein accommodating the free end of the nose plate when the latch is swung from inoperative to operative latching position.

8. The hand truck of claim 3 wherein said suspension frame system mounting and support part on said main frame assembly comprises one of said lateral rails and said suspension frame system incorporates a hook hooking over said one of said lateral cross rails.

9. The hand truck of claim 3 wherein said support assembly is pivotally mounted by said side rails to fold upwardly to a position generally in alignment with said elongate main frame assembly.

10. The hand truck of claim 5 wherein said suspension frame system mounting and support part comprises a pair of laterally spaced horizontal tube sockets.

11. The hand truck of claim 5 wherein said device comprises a socket receiving the opposing outer end of said suspension frame system.

12. The hand truck of claim 9 in which said secondary wheels are mounted on said nose plate carrying rails near the head end of the main frame assembly.

13. The hand truck of claim 9 wherein said subframe carries said secondary wheels.

14. A method of assembling a load carrying fabric receptacle, having an upper suspension framework with outer and inner ends from which said fabric receptacle is suspended, on a convertible hand truck, usable in generally vertical two wheel configuration and in generally horizontal disposition with secondary wheel support, said hand truck having an elongate main frame assembly with a head end and a base end, a pair of axle-supported wheels connected to said base end of said main frame assembly, the main frame assembly incorporating a load transporting nose plate at its said base end extending generally perpendicularly outwardly beyond said main frame assembly; an elongate subframe; a coupling assembly mounting the subframe on said main frame assembly to permit said main frame assembly to be shifted from a position generally paralleling said subframe when the said main frame assembly is in two-wheeled cart configuration to a generally horizontal position generally perpendicular to the subframe; and a secondary wheel system supporting the main frame assembly when the main frame assembly assumes the generally horizontal position; the steps of:

a. connecting a support assembly, having an outer end, to be supported at the base end of the main frame assembly to provide an extension projecting outwardly beyond said nose plate;

b. providing a suspension framework support device on said outer end of said support assembly to carry said outer end of the suspension framework;

c. interfitting said subframe and said suspension framework to carry said opposite inner end of said suspension framework; and d. demountably interfitting said suspension framework with said support device.

15. The method of claim 14 wherein said support assembly comprises an extension part extending parallel to said nose piece and a support arm assembly demountably provided on said suspension framework depends therefrom to be interfitted with said support device.

16. The method of claim 14 wherein said mainframe assembly carries said secondary wheel system and the subframe is a secondary handle pivotally and slidably mounted on said main frame assembly, and step c. includes mounting a socket member on said secondary handle so that the inner end of said suspension framework can be carried thereon.

17. The method of claim 14 wherein said subframe is pivotally and slidably carried on said main frame assembly and carries said secondary wheel system at one end, and step c. includes mounting a socket on the opposite end of said subframe so that the inner end of said suspension framework can be carried thereby.

18. The hand truck of claim 11 wherein said sockets are open at upper ends permitting said suspension frame system to be received therein and be lifted upwardly therefrom; said suspension frame system comprising a pair of opposed, pivotally connected U-shaped frame members permitting relative pivoting of the U-shaped frame members to collapsed condition.

\* \* \* \* \*